Patented Mar. 3, 1936

2,032,818

UNITED STATES PATENT OFFICE 2,032,818

ART OF PREPARING PALATABLE BEVERAGES CONTAINING ALCOHOL

William Oscar Sweek and Julius S. Benroth, Phoenix, Ariz., assignors of one-third to James A. Saunders, Washington, D. C.

No Drawing. Application December 27, 1933, Serial No. 704,207

11 Claims. (Cl. 204—26)

The present invention relates to the art of treating raw liquids containing alcohol whereby to produce acceptable and palatable beverages therefrom.

Instances are already known in which preservatives have been added to alcohol-containing liquids to prevent further bacterial and enzym action therein, and in which such beverages have been pasteurized for a like purpose. Inventors have also proposed to subject distilled alcohol-containing liquids to the action of electrified air or ozone for the purpose of "aging" the liquids, and many efforts have been made to mature a whiskey or other beverage by passing atmospheric air or a combination of nitrogen and oxygen through a flaming electric arc and then passing the gas thus produced through the beverage. In previous processes, the gas thus produced has been variously denominated ozone, electrified air, various combinations of nitric or nitrous oxides, ionized air, etc. Attempts have also been made to mature a liquor by means by adding various acids, etc. While all of these processes undoubtedly make a change in an alcoholic beverage, none of them has been successful in effecting the desired results and none of them bring the liquors so treated to their full maturity or development.

The raw liquid from the vat or still is not acceptable, and sometimes not palatable. Freshly distilled whiskey, for instance, is colorless, it has a rank smell and is harsh and irritating to the skin. The usual mode of maturing alcohol-containing liquids for beverage purposes was to store them for long periods of time under variable conditions.

The present invention is concerned with means of producing an acceptable and palatable beverage with alcoholic content in which the long times (from 4 to 16 years in whiskey, 1 to 2 years in brandy, etc.) of storage in charred containers is no longer necessary, and one which is less harmful and which contains less poisonous substances such as aldehydes and furfurals than when stored in a barrel for long periods of time. The desired results are preferably attained by storing the liquid for a preliminary period in a charred oak container during which it absorbs some of the coloring matter and some of the taste- and odor-producing constituents from the char and oak of the porous container, then accelerating the "aging" of the liquid by a gassing operation which deepens the color, destroys the obnoxious odor and taste of the raw beverage, eliminates the poisonous aldehydes and gives to the liquid a bead, a smoothness, a mellowness and an oilyness approximately equal to that found in a whiskey which has been aged-in-the-wood for sixteen (16) years. The whiskey may be dispensed immediately after the gassing operation, but more satisfactory results are obtained if the whiskey is allowed to aerate for some time after gassing. Still better results are obtained if the liquid is subjected to an after storage period of from 3 to 9 months in a charred barrel.

This preferred preliminary storage period for a distilled liquor extends from ten days to six months, with the liquor in contact with the char of a normal storage container, so that the coloring matter, etc., thereof is taken up by the liquor. This time is related to the temperature and to the state of the char, being much less at an increased temperature, and also being less when the liquor is brought to and removed from the char, as by agitation or adding pulverized char to the liquor. During this preliminary storage period, the originally low acids tend to rise gradually, along with an increase also in the ester content.

This acceleration treatment is accomplished preferably by bringing into contact with the liquor a gas which is formed by the action of an electric spark upon atmospheric air. This gas, however, is not used in its condition immediately upon electrification. Instead, the gas is stored or delayed prior to its employment in contact with the liquor until it attains a condition which is denominated "normalized" herein. It has been found that the contacting of the gas with the liquor, immediately after the electrical treatment of the gas, does not set up the necessary phenomena in the liquor, while the gas after passing through this "normalized" stage attains a condition of inertness by "over-aging".

The conditions for producing a gas of proper "normalized" behavior depends upon variables, among the most important of which are: (a) the size and intensity of the arc, (b) the length of time the air is in contact with the arc, (c) the volume of the chamber enclosing the arc, (d) the length of time required for the gas to move from the arc to the point of use, (e) the volume of this discharge conduit.

The increase of intensity of the arc favors the quick production of the "normalized" gas: so that the employment of a higher voltage at the arc is more advantageous than the employment of a relatively low voltage. Thus with a given arc and apparatus, the employment of a voltage of 16500 produces a gas of say index value of 34; while a voltage of 11000 affords a gas with a corresponding index value of 10. By using smaller electrodes, the apparent intensity of the arc is increased and the index value raised.

The length of time for which the air is in contact with the arc may be varied by changing the air pressure at a nozzle through which the air is projected between the arc electrodes, and by varying the diameter of the outlet. With other conditions the same, two pounds of air pressure will give an index value (as above) of 34, while four pounds of air pressure will give an index value of 20.

The size of chambers and passages has a decided influence upon the aging. With other conditions the same, the use of small chambers and conduits leads to an "under-aged" gas at the point of use; while an excessive increase of their volumes and lengths leads to "over-aging".

When the gas is "under-aged", the fact may be ascertained by physical, chemical and physiological phenomena. The fresh gas, when passed through a solution of one-hundred proof freshly distilled whiskey produce no fumes when the gas and the liquor are at substantially room temperature. If this gas be passed through distilled water, the acidity increases only slowly with continued gassing. Such gas has a relatively low germicidal power, taking for example ten minutes to destroy bacteria. The passage of such gas for five minutes through ten ounces of whiskey will produce for example ten parts of acid per hundred thousand, and a continued gassing for ten minutes results in no substantial further increase in acidity. Such gas when passed through a whiskey which has been aged for some months in the presence of char, or through a tannic acid solution, will produce a very slow change in color. Such gas in a given time will only reduce the aldehyde content of the whiskey to one-half, as a matter of comparison with a reduction to less than one-sixth with a properly "normalized" gas.

When the gas has been produced, and permitted to age for a sufficient period to normalize itself, and is then passed through one-hundred proof whiskey, a smoke or vapor will be seen to rise from the liquid regardless of room temperature. The passage of "normalized" gas through distilled water causes a very rapid increase in acidity. The germicidal power of "normalized" gas is high, the same destructive power being exerted in one minute, in comparison to the ten minutes set out above. The passage of such "normalized" gas through ten ounces of whiskey for five minutes will cause an acidity of say twenty parts, and a further gassing of five minutes will lead to an acidity of forty parts, and in fifteen minutes to an acidity of fifty parts: in comparison to the constant ten parts for the fresh gas. When the "normalized" gas is passed through the stored whiskey, or a tannic acid solution, a very rapid change of color occurs; and likewise the aldehyde content is rapidly reduced.

When the gas has been over-aged, no vapor is seen upon passing it through one hundred proof whiskey. The acidity produced in distilled water is high. The over-aged gas is practically inert in germicidal properties. The over-aged gas, in passing through ten ounces of whiskey under the conditions above, gives an acidity of around twenty parts in five minutes, and this acidity does not increase during an additional ten minutes. The over-aged gas causes a very slow color change in a stored whiskey or in a solution of tannic acid.

A physiological difference between the "normalized" gas, as compared with fresh gas or over-aged gas, is the behavior of a guinea-pig when exposed to them. The fresh gas has an action quite similar to that of laughing gas or nitrous oxide; anaesthetization will occur in six minutes, for example, and complete recovery to normal after removal from the gas will occur in four or five minutes. Exposure to the "normalized" gas produces no signs of anaesthesia, but the pig remains comparatively quiet with occasional spells of great activity and uneasiness, and at the end of thirty minutes the breathing is labored and œdema of the lungs occurs. The over-aged gas has practically no effect.

It will be understood that these examples describe the initial, operative, and final conditions of the gas; but these conditions blend into one another by gradual transitions. The characteristics of the gas during the "normalized" phase produces effects impossible with the fresh gas or with the over-aged gas.

With the above statements of the effects of the gas in its several conditions, an expert can obviously determine whether a particular sample of gas is over or under-aged, and can then correct to obtain the proper conditions by varying the volumes of the chambers, intensity of the arc, etc.

As a specific instance of employment, a transformer having a secondary voltage of 16,500 at a rate of 1 kva. was employed in conjunction with a spark gap. This spark gap included a pair of electrodes of copper $\frac{5}{32}$ inches in diameter, each having an upward and then a downward curve, the ends of the electrodes being about $\frac{1}{4}$ inch apart, and the summit of their bends being about $1\frac{1}{2}$ inches apart, so that the arc formed at the bottom moved upwardly as it progressed and then broke at the top with a length of about 4 inches. This arc was covered with a glass vessel of five liters capacity, held onto a fixed bottom plate by appropriate dogs or clamps, a cork gasket being employed to complete the closure. The air was introduced under two pounds pressure through a small copper pipe of $\frac{1}{16}$ inch internal diameter, which projected the jet of air upwardly in the plane of and between the ends of the electrodes. The gas was permitted to escape from the chamber through a pipe of $\frac{1}{4}$ inch internal diameter, the outlet being located at substantially the same elevation as the inlet in the particular example. A rubber hose of $\frac{1}{4}$ inch inside diameter and about 12 feet long was employed for drawing off the gas and introducing it into the liquid from which the gas was to bubble.

By way of comparison, with respect to the effects of volume of the enclosing vessel and the delivery conduit, when the volume was from 1000 cc. to 2000 cc., the gas was "under-aged", as referred to in the above tests. When the volume was from 2000 to 20,000 cc. in capacity, the acidifying power upon distilled water indicated that a "normalized" gas was being produced. When the volume was increased from 20,000 to 50,000 cc., the acidifying power did not increase rapidly with increase of time; and with the largest volume, the gas was "over-aged" and substantially inert unless accumulated under pressure as brought out above.

It has been found that the machine described above operates with satisfaction, but that it is possible under appropriate change of conditions to use air pressures from one-fourth pound to thirty pounds on the gauge, with voltages ranging from 500 to 38,000, with direct and alternating current, using electrodes of various sizes, shapes and kind of such metals as iron, copper, aluminum and platinum. The volume of the vessel constituting the arc chamber was varied from three cubic inches to 640 cubic inches, and the volume of the hose (with and without added "aging" chambers along the delivery conduit) from 250 cc. to 50,000 cc. in capacity. When the capacity of the chamber immediately around the arc was small, the aging chamber was correspondingly larger in order to obtain a proper normalization of the gas.

As examples of the manner of practicing the present invention, the following may be indicated:

Example I

A freshly distilled whiskey is stored in a charred barrel for three weeks so that it will extract some color, essence and solids from the char and oak in the barrel. Heating may be used to accelerate the extraction action. Normalized gas from the above-described machine is then passed through the whiskey. The time of gas treatment, or volume of gas, may be controlled by comparing samples of the treated whiskey with a sample of the whiskey ready for gas treatment. When the color has approximately doubled or when additional gassing does not occasion a further substantial color change, as may be determined by colormetric tests, the minimum time has occurred. The continued passage of gas ultimately leads to the destruction of the "bead" of the whiskey, and the bubbles formed upon shaking in a flask become small or even disappear; and also the excessive employment of gas leads to a precipitation of colloids so that the sample appears "muddy". These controls may be employed, in determining whether the liquor has received the gas treatment for the proper length of time. It may be pointed out that one pint of liquor will approximately double in its depth of color in three to five minutes; a gallon in ten to twenty minutes; and ten gallons in one to two hours, with the same machine and with otherwise the same operating conditions.

A preferred method of control is to remove an initial sample from the barrel, treat it with gas until the color has deepened and the whiskey has reached a condition where a further use of gas causes no additional deepening. With the pint sample, as indicated above, this requires about three to five minutes with the particular machine. The rest of the barrel may then be subjected directly to the gas treatment, comparing its color from time to time with that of the treated sample. The operation can be terminated when this color has been reached by the remaining contents of the barrel, or it may be continued for a further time, short of the precipitation of colloids or less of the bead.

Another test, but involving a chemical analysis, is that of determining the aldehydes present in the treated whiskey. When the aldehyde content is reduced substantially to zero, the gassing may be stopped. Also, a chemical control may be based upon gassing until the acidity has reached a predetermined amount.

The taste, odor, color, aldehyde content, acid content, and bead are all modified by the gas treatment, and the liquor acquires a greater "smoothness"; and from them a person who has practiced the method can determine with accuracy the proper quantity of gas, by volume or time, to be employed.

Although the whiskey may be used immediately after this gassing operation, it should preferably be stored for a few days and be aerated. During this period some reaction appears to take place in the liquid, which causes a more or less sour or foul odor to escape from the container in which the liquid is stored, and the whiskey itself appears to improve both in flavor and aroma. For aeration, the whiskey may be stored either in a glass or other container but preferably in a barrel or other permeable-wall container containing charcoal. Following this aeration period, the whiskey may further be stored in a barrel or permeable-wall container in the presence of charcoal for a considerable period of time (from 3 to 9 months). During this period it may be heated or agitated. This additional storage period further deepens the color and improves the taste and aroma of the whiskey.

The length of time required for storage can be determined by successively testing the product. The final product, made by this preferred method, is characterized by aroma, taste, bead, etc., which are substantially identical with those of a liquor which has been aged under the normal procedure for many years. The treatment reduces the intoxicating and headache-producing properties of the liquor, and the latter does not cause drowsiness like raw liquors, apparently because of the reduction of physiologically harmful aldehydes. In lieu, the acids and esters which confer the bouquet or aroma are produced.

This period of after storage also may be accelerated by increasing the supply of oxygen and by warming the liquor.

Example II

A raw whiskey from the still is subjected to gassing from the above-described machine until the obnoxious odors are removed and/or the chemical test shows that the aldehydes have been destroyed. The liquor is permitted to stand in a closed glass container, the stopper being removed from time to time, and the vapors permitted to escape from the surface before reclosing. Artificial coloring and flavoring of caramel, fruit juices or essences, etc., may be incorporated. In from ten days to two weeks the liquor is ready for use. The material appears less harmful physiologically than a rectified liquor made from ethyl alcohol and flavoring, as it contains essential oils and acids which appear to act as a neutralizing agent for the severe toxic effects of the ethyl alcohol, and is substantially free of aldehydes.

Example III

A whiskey which has been stored in a charred barrel for three or four months at room temperature, or which has been stored in a charred barrel for three or four days and heated for three or four hours to a temperature slightly below the boiling point, is treated with gas from the above machine until the color is approximately doubled, and the aldehydes are eliminated. This gassed whiskey is directly blended with a naturally aged whiskey in proportions of from five to fifteen parts of the gassed liquor to one part of the old whiskey. It has an excellent flavor and aroma. The product contains very few aldehydes, is free from the deleterious effects of such aldehydes, and yet contains the essential oils and materials which counteract the toxic effects of the ethyl alcohol itself. In fact, the color, flavor and general chemical constitution of such a blended liquor can be made substantially identical with that of a whiskey aged for sixteen years in the wood by the addition of a few drops of acetaldehyde per gallon.

Example IV

While in Example II above, raw whiskey was treated by bubbling gas through it, it is also possible to contact the liquor with the gas while in vapor form on its way from the still to the condensing chamber. This condensing chamber may appropriately contain char, dried fruit, or like extractable matter. The condensed liquor may then be stored in a charred keg to attain the desired color and essence content by absorption from the keg walls. It is also possible to add artificial coloring such as caramel or prune juice. Thus a gin may be quickly and directly prepared and "aged".

Example V

A quick manner of bringing a raw distilled liquor to acceptably palatable condition is to treat the raw liquor immediately with the gases above, and then store the liquor for a suitable time in a permeable-wall container in the presence of char. The treated liquor absorbs coloring and flavoring matter from the char, and the permeable walls likewise appear to cause a rapid improvement and aging of the liquor. While such walls may be the internally charred staves of an oak keg, for example, it is possible to attain a similar result by using a porous pottery container, of the nature of an olla, to advantage by reason of the greater permeability, with the introduction of the char in the form of particles or chunks within the olla.

The effect of the gassing, in each instance, may be determined by the control tests indicated. The gassing removes the obnoxious odor from the raw whiskey and gives it a smooth and mellow taste. With whiskies which have been stored in charred kegs, the color is deepened. The whiskey becomes more oily and less irritating to the skin. The acids are increased but the fusel oils are very slightly reduced (less than ten percent), and the aromatic esters and essential oils are not reduced. The gas treatment at first increases the "bead" of the whiskey, but overgassing leads to a reduction in the "bead", and with a considerable overgassing no bubbles are formed at all upon shaking. Apparently, however, this destruction of the bead does not ruin the whiskey, but a longer time of after storage is required before the described equilibrium is again reached.

Some of the examples above have been directed specifically to different phases possible of treatment of whiskey, but the procedures may also be employed with other alcohol-containing liquors, such as rum, gin, brandy, cognac wine, beer, etc.

While the procedure has been set out above as comprising the treatment of the beverage with a gas produced by the action of an electric arc followed by aging until the gas has reached a "normalized" condition, it is found that this type of gas may also be produced by contacting air with a very hot plate, followed by a similar aging treatment. Since this "normalized" gas is present as a fact, no theory of thermal, electrical, or ionizing action of synthesis or decomposition is propounded. The characteristics of the gas in this condition are marked, and such gas, in condition for the procedure, is herein referred to as "normalized" gas.

The present invention is not founded upon any particular theory, but upon the facts of particular treatment. That is, the operation occurs, regardless of whether it be considered that the electrified air originally contains ozone, nitrogen oxides, ionized bodies, etc., and regardless of what occurs during the "normalizing". Further, the action is a matter of fact, regardless of theories which have been proposed relative to the formation of nitrogen acids, nitrous etc. esters, nitro-bodies or simple oxidations and dehydrogenations, during and following the gas treatment; and in part appears to involve a selective oxidation.

A primary feature of the present invention, therefore, is the use of a gas which may be produced by the electrification or heat-treatment of atmospheric air, followed by a storage or "aging" of the gas so that it reaches a "normalized" condition. By "normalized" condition and "normalization" in this description and in the claims, we refer to the condition or state of the treated gaseous mixture which can be produced by detaining the mixture until it has a high germicidal power, a high acidifying power upon water, a power of quickly changing the color of tannic acid solution or whiskey aged in the presence of char, and a power of quickly reducing the aldehyde content of whiskey; this detaining being so limited that "overaging" has not occurred with the accompanying phenomena of decrease of germicidal properties, and of slow color change of the tannic acid solution or of the char-aged whiskey.

The invention is not limited solely to the examples of practicing described, but may be employed in many ways within the scope of the appended claims.

Having thus described the invention, what is claimed as new and desired to secure by Letters Patent, is:—

1. The process of preparing a palatable beverage containing alcohol, which includes the steps of treating a mixture containing oxygen and nitrogen gases by an electric discharge, detaining the treated mixture until it is in normalized condition, and contacting the normalized mixture with alcohol-containing fluid prior to the time when the said mixture has attained a maximum acidifying power upon distilled water.

2. The process of preparing a palatable beverage containing alcohol, which includes the steps of storing a raw distilled liquid containing alcohol and fusel oil in contact with a char material so that the liquid may absorb matter therefrom, treating a gaseous mixture containing nitrogen and oxygen by an electric discharge, detaining the treated mixture until it is in normalized condition, contacting the normalized mixture with the stored liquid, and further storing the contacted liquid in the presence of char material to improve the odor- and taste-determining substances of the liquid.

3. The process of preparing a palatable beverage containing alcohol from a raw alcohol-containing liquid, which includes the steps of treating a gaseous mixture containing oxygen and nitrogen by an electric spark discharge, detaining the treated mixture until it is in normalized condition, and contacting the normalized mixture with the raw liquid prior to the time when the said mixture has passed from said normalized condition.

4. The process of preparing a palatable beverage containing alcohol from a raw distilled alcohol-containing liquid, which includes the steps of treating a gaseous mixture of oxygen and nitrogen at a high temperature for producing a gas containing nitrogen oxides, detaining the gas until it is in normalized condition, said detaining occurring at a lower temperature, and then contacting the detained gas while in such normalized condition with the raw liquid for increasing the acid content and reducing the aldehyde content thereof.

5. The process of preparing a palatable beverage from a raw distilled liquor, which includes the steps of contacting the liquor with a selectively oxidizing agent having the property of the gas produced by subjecting air to an electric spark discharge and detaining the treated air until it is in normalized condition, the contact being accomplished before the acidifying power reaches a maximum, and thereafter storing the contacted liquor in a permeable-wall chamber in the presence of a char matter.

6. The process of quickly producing a high color in an alcoholic liquor, which includes the steps of contacting the liquor with charred material for extracting coloring matter therefrom, treating air by an electric discharge and detaining the treated air until it is in normalized condition, and contacting the treated and detained air with the liquid prior to the time the said air has passed from said normalized condition.

7. The process of quickly preparing a palatable liquor from an alcoholic liquor having the obnoxious odor of raw liquor, which includes the steps of treating a gaseous mixture containing oxygen and nitrogen by electric spark discharge, detaining the treated mixture until it is in normalized condition, contacting the treated and detained mixture with the said alcoholic liquor prior to the time when the said mixture has passed from said normalized condition, and thereafter storing and aerating the treated liquor until foul gases are substantially eliminated.

8. The process of preparing a palatable beverage from a raw distilled liquor, which includes the steps of contacting the liquor with charred matter for a period while extraction occurs, treating air by electric discharge, detaining the treated air until it is in normalized condition, contacting the treated and detained air with the stored liquor prior to the time when the said treated and detained air has passed from said normalized condition, and thereafter storing the liquor in a premeable-wall chamber in the presence of charred matter.

9. The process of preparing a blended alcoholic liquor which includes the steps of treating air by electric discharge, detaining the treated air until it is in normalized condition, contacting the normalized air with the raw liquor until the obnoxious odor of raw liquor disappears and the liquor becomes smooth and mellow, and mixing the treated liquor with a normally aged liquor.

10. The process of preparing a blended alcoholic liquor which includes the steps of treating a gaseous mixture containing oxygen and nitrogen by electric discharge, detaining the treated mixture until it is in normalized condition, contacting the same while in such condition with a raw alcohol-containing liquor until the obnoxious odor of raw liquor disappears and the liquor becomes smooth and mellow, preparing also an alcoholic liquor by storage in the presence of char, and mixing the liquors.

11. A palatable alcoholic beverage containing the products resulting from the treatment of an alcoholic liquor with a gas produced by electric spark discharge treatment of air with subsequent detention until the treated gas attains a normalized condition, and characterized by the absence of the obnoxious odor of raw alcoholic liquor and by the low aldehyde content.

WILLIAM OSCAR SWEEK.
JULIUS S. BENROTH.